United States Patent [19]

Jenkins

[11] 4,202,598
[45] May 13, 1980

[54] BINOCULARS WITH INDIVIDUAL QUICK FOCUSING EYEPIECES

[76] Inventor: Albert R. Jenkins, 10267 Houser, Lenexa, Kans. 66215

[21] Appl. No.: 950,007

[22] Filed: Oct. 10, 1978

[51] Int. Cl.$^2$ .......................... G02B 23/00; G02B 7/06
[52] U.S. Cl. ........................................ 350/36; 350/46; 350/76
[58] Field of Search ...................... 350/76, 77, 36, 46, 350/47, 41, 44, 74

[56] References Cited

U.S. PATENT DOCUMENTS

| 1,514,419 | 11/1924 | Berggren | 350/77 |
| 4,066,329 | 1/1978 | Van Exel | 350/77 |

FOREIGN PATENT DOCUMENTS 5287 of 1890 United Kingdom ...................... 350/77

Primary Examiner—Jon W. Henry
Attorney, Agent, or Firm—Lowe, Kokjer, Kircher, Wharton & Bowman

[57] ABSTRACT

A binocular device wherein the two ocular lenses may be quickly focused entirely independently of one another. Rocker bars located between the bodies of the telescopes may be pivoted by the fingers to focus the respective lenses while the binocular device is held to the eyes in the normal manner. A rack and pinion mechanism for each rocker bar engages a slide pin which is connected with the ocular lens housing in order to move the lens housing toward and away from the corresponding objective lens as the rocker bar is pivoted in opposite directions.

8 Claims, 3 Drawing Figures

BINOCULARS WITH INDIVIDUAL QUICK FOCUSING EYEPIECES

BACKGROUND AND SUMMARY OF THE INVENTION

This invention relates generally to binoculars and more particularly to a quick focus binocular device wherein the individual ocular lenses are adjustable independently of one another.

Conventional binoculars are focused by means of a knob or wheel which effects adjustment of both of the ocular lenses in unison until the image is properly in focus. One of the ocular lenses has an individual eyepiece focus ring or the like which is then turned to compensate for any dioptric differences between the user's eyes. Focusing of conventional binoculars thus entails initial focusing of the two ocular lenses together followed by a final adjustment of the focus ring, a procedure that is difficult and time consuming as well as lacking in accuracy. Often, the initial focusing step properly focuses the lens which does not have the individual focus ring. In this case, any attempt to adjust the focus ring will be unsuccessful and the procedure must be repeated from the start if proper overall focusing is to be achieved. As can be easily appreciated, the inaccuracy and the frequent need to repeat the focusing procedure a number of times results in considerable inconvenience and frustration to the user of the instrument.

It is therefore apparent that a need exists for a binocular device wherein both eye pieces can be quickly and conveniently focused with precision. It is the primary goal of the present invention to meet that need.

More specifically it is an object of the invention to provide a binocular device which has individual control of the adjustment of each ocular lens independently of the other ocular lens. Since focusing of each lens is carried out separately and independently of the other lens, each lens can be quickly and accurately adjusted to the eye, and there is no need to separately compensate for any dioptric differences between the eyes. An individual focus ring for one the eye pieces is thus unnecessary and the expense of the focus ring is eliminated.

Another object of the invention is to provide a binocular device of the character described wherein adjustment of the ocular lenses can be effected quickly and conveniently. The adjustments are made with the fingers which are applied to rocker bars while the device is held in the hands in the normal fashion. Thus, the telescope held by the user's right hand is adjusted with the fingers of the right hand and the telescope held by the left hand is adjusted with the fingers of the left hand.

Still another object of the invention is to provide a device of the character described in which pivotal motion of the rocker bars is translated into precise adjustment of the ocular lenses.

An additional object of the invention is to provide a binocular device of the character described which is constructed simply, economically, and ruggedly.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views.

Figure 1:
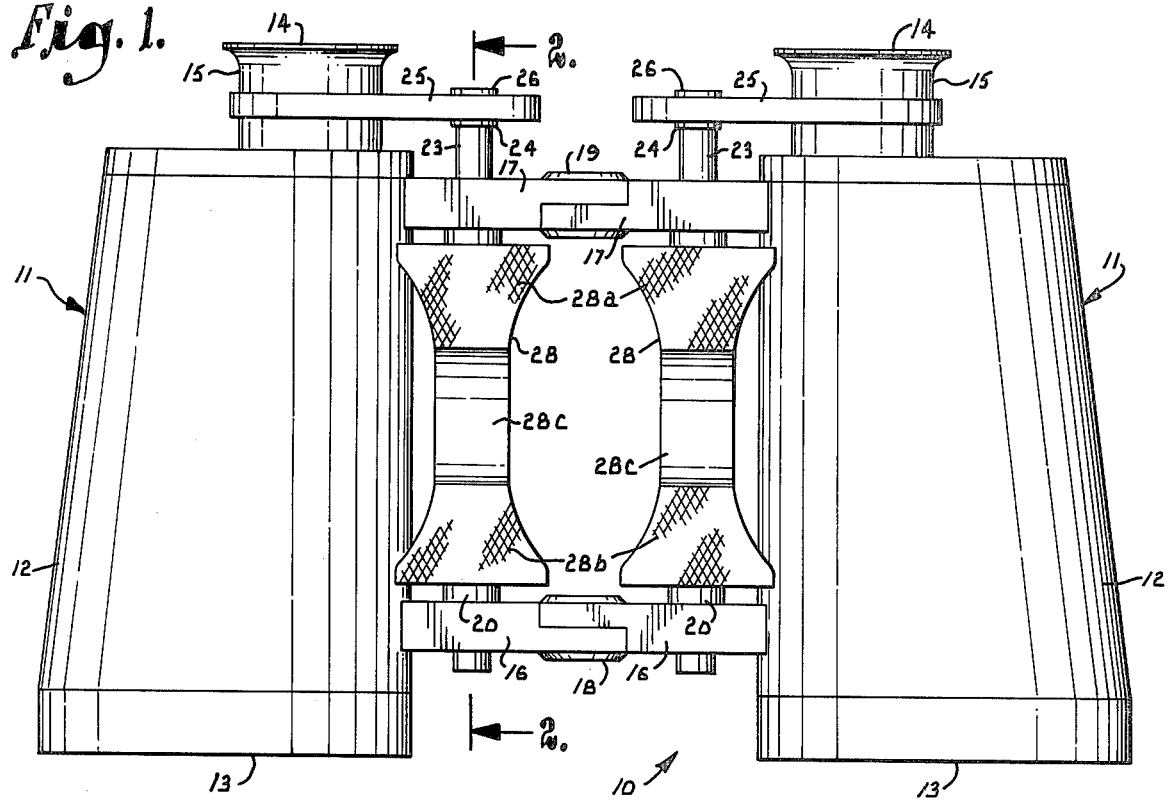
FIG. 1 is a plan view of a binocular device constructed according to a preferred embodiment of the present invention.

Referring to the drawing in more detail and initially to FIG. 1 numeral 10 generally designates a binocular device having a pair of monocular prism telescopes 11. Each telescope includes the usual barrel like body portion 12 having an enlarged end which contains an objective lens 13. The eye piece or ocular lens 14 for each telescope is contained in a cylindrical lens housing 15 located on the end of the telescope opposite lens 13. Each lens housing 15 is mounted on a tubular support (not shown) which permits the lens housing to slide toward and away from the corresponding body 12, thereby adjusting the distance between the ocular and objective lenses to provide a focusing adjustment.

Each of the body portions 12 contains a conventional optic system which directs the light passing through lens 13 toward lens 14 in order to magnify the image in a conventional manner. The details of the optic system do not form part of the present invention, and any suitable optic system may be employed.

The body portions 12 of the telescope are hinged together by hinge brackets 16 and 17. Brackets 16 project inwardly from the bodies near their large ends and are pivoted together by a pivot coupling 18. Brackets 17 are located near the opposite ends of the telescope bodies and are pivoted together at their inner ends by a coupling 19. Couplings 18 and 19 provide a common hinge axis about which bodies 12 may be pivoted to move the ocular lenses 14 closer together or farther apart so as to adjust to the interpupillary scale.

The lens housings 15 maybe moved independently of one another by separate adjustment mechanisms, each of which includes a hollow tubular sleeve 20. The opposite ends of each sleeve 20 are received in openings formed through hinge brackets 16 and 17. The sleeves are thus mounted in extension between brackets 16 and 17 parallel to one another and to the length dimension of the telescopes 11. The sleeves are located slightly inwardly of bodies 12 on opposite sides of the hinge axis defined by the pivot couplings 18 and 19.

The adjustment mechanisms for the ocular lenses 14 are identical to one another. Therefore, only one adjustment mechanism will be described in detail, it being understood that the other mechanism is constructed and arranged in substantially the same manner.

Figure 2:
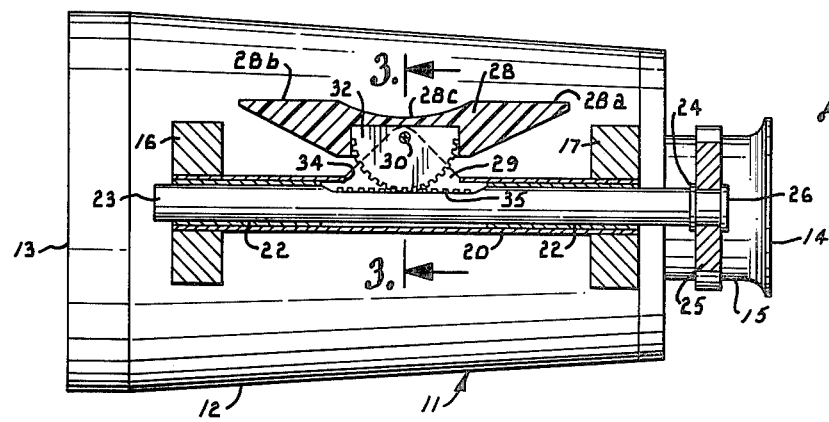
FIG. 2 is a sectional view taken generally along line 2—2 of FIG. 1 in the direction of the arrows.
Figure 3:
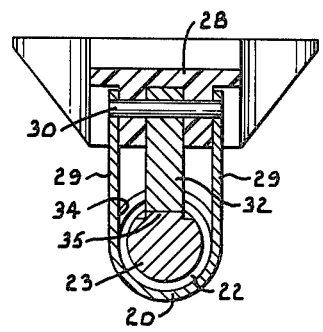
FIG. 3 is a fragmentary, sectional view on an enlarged scale taken generally along line 3—3 of FIG. 2 in the direction of the arrows.

With particular reference to FIGS. 2 and 3 a pair of tubular bushings 22 are fitted in each sleeve 20 at the opposite end portions thereof. A cylindrical pin 23 is received in each sleeve and supported by bushings 22 for sliding movement in the direction of the longitudinal axis of the pin. Each pin 23 projects out of the ends of the sleeve and is provided with a collar or flange 24 near one end. The end of the pin is inserted through an opening in an arm 25 which is fitted around an rigidly connected with lens housing 15 at the opposite end. A screw having an enlarged flat head 26 is threaded into the end of each pin 23 to connect the pin with arm 25.

The flange and screw head contact opposite surfaces of arm 25 to rigidly secure it to the pin.

A rocker bar 28 is pinned between a pair of spaced apart lugs 29 which extend upwardly from each sleeve 20 near its center. Each rocker bar 28 is pivotally mounted by a pivot pin 30 which is inserted through the center of the bar and through openings formed in lugs 29. The upper surface of bar 28 is formed to readily accomodate the fingers, which are used to pivotal the bar about pin 30 in order to adjust the ocular lens 14. The end portions of each rocker bar are widened and have flat upper surfaces 28a and 28b which are cross-scored to facilitate application of the fingers thereto. A concave surface 28c is formed on the upper surface of bar 28 between the finger receiving surfaces 28a and 28b and above the pivot pin 30.

A pinion gear 32 of generally semicircular shape is received in a recess formed in the underside of each rocker bar 28. Gear 32 has a flat upper edge which engages a flat surface of bar 28 to assure that the gear will turn in response to pivotal movement of the rocker bar. The pivot pin 30 extends through gear 32 to form a central axis about which the gear turns when rocker bar 28 is pivoted about the pin.

Gear 32 projects through a slot 34 formed in the upper surface of sleeve 20 between lugs 29. The upper surface of pin 23 is flattened at a central portion thereof and provided with teeth to form a rack 35. The rack 35 is located directly below slot 34 and meshes with the peripheral teeth of gear 32 so that turning of the gear in the opposite direction slides pin 23 back and forth within sleeve 20.

In use, the binocular device 10 is held in the conventional fashion with the hands gripping the body portions 12 of the telescopes. Focusing is accomplished individually for each eyepiece by manipulating the associated rocker bars 28. When the device 10 is held in the usual viewing manner, such that the user's right hand grips the right telescope and the left hand grips the left telescope as the ocular lenses 11 are raised to the eyes, the fingers of each hand comfortably rest on the rocker bar 28 adjacent to the telescope being gripped.

Focusing is ordinaily carried out by the index and middle fingers which are applied to the respective scored surfaces 28a and 28b. To move either ocular lens 14 toward the corresponding objective lens 13, surface 28a is pressed downwardly by the index finger to pivot rocker bar 28 in a direction to slide pin 23 to the left as viewed in FIG. 3. This movement of the pin carries lens housing 15 toward the corresponding body 12 due to the rigid linkage provided by arm 25. If lens 14 is moved too far such that it moves past the position of correct focus, surface 28b may be pressed downwardly with the middle finger to move the lens in the opposite direction until it is properly focused.

It should be evident that movement of either ocular lens 14 away from the corresponding objective lens 13 can be accomplished by pressing down on surface 28b with the corresponding middle finger engaging that surface. This causes pin 23 to slide to the right as viewed in FIG. 2 and thus moves housing 15 to the right or away from body 12. The two rocker bars 28 are independently manipulated in this fashion to individually focus each lens 14 separately and independently of the other lens. When a position of proper focus is reached, the friction of the rack and pinion mechanism holds the parts in place until they are moved to refocus the lenses.

Rocker bars 28 thus serve as levers by which individual focusing of the telescopes can be quickly and easily carried out. The location of the rocker bars at positions readily accessible to the fingers while the device is held to the eyes in the normal fashion facilitates focusing. The orientation of the pivot pins 30 perpendicular to bodies 12 also enhances the convenience of focusing. The rocker bars can be easily manipulated by the index and middle fingers of the corresponding gripping hand with accuracy since a counteracting or balancing force can be applied by the finger which is not being pressed down. Motion of the slide pins 23 parallel to bodies 12 simplifies the structure in that such motion is parallel to the required motion of housings 15, and the simple arms 25 can thus form the linkage between the pins and lens housings.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A binocular device comprising:
   a pair of telescopes each having a body portion and an associated optical element, said body portions being coupled together in a manner permitting adjustment of the distance between said optical elements to adjust the interpupillary spacing;
   means mounting said optical elements for movement generally toward and away from the respective body portions to optically adjust said elements; and
   an adjustment mechanism operable to effect individual movement of each optical element relative to the corresponding body portion separately and independently of the other optical element, thereby permitting each of said optical elements to be optically adjusted in an independent manner;
   wherein said adjustment mechanism includes a lever for each optical element, said levers being disposed between and in proximity to the respective body portions at locations accessible to the fingers when said body portions are held in the hands, said levers being engageable by the fingers to effect individual movement of the respective optical elements relative to the corresponding body portions.

2. A device as set forth in claim 1, wherein said levers are spaced apart and generally parallel to one another, each lever being supported to pivot about a pivot axis oriented generally perpendicular to the length dimension of the corresponding body portion.

3. A device as set forth in claim 2, wherein the pivot axis for each lever is located substantially centrally of the lever and said optical elements are moved toward and away from the respective body portions in response to pivoting of the respective levers in opposite directions.

4. A binocular device comprising:

a pair of telescopes each having a body portion and an associated optical element, said body portions being coupled together in a manner permitting adjustment of the distance between said optical elements to adjust the interpupillary spacing;

means mounting said optical elements for movement generally toward and away from the respective body portions to optically adjust said elements; and an adjustment mechanism operable to effect individual movement of each optical element relative to the corresponding body portion separately and independently of the other optical element, thereby permitting each of said optical elements to be optically adjusted in an independent manner;

wherein said adjustment mechamism includes a slide member for each optical element, said slide members being supported for sliding movement in the general direction of the length dimension of said body portions and being coupled with the respective optical elements in a manner to individually move said elements toward and away from the corresponding body portions in response to sliding movement of said slide members; a lever for each slide member, said levers being supported for pivotal movement and being adapted to be pivoted by the fingers; and coupling means for coupling said levers with the respective slide members to effect sliding movement thereof in response to pivoting of said levers.

5. A device as set forth in claim 4, wherein said coupling means includes a rack and pinion mechanism.

6. A device as set forth in claim 4, wherein said coupling means includes:

a gear carried by each lever, said gears turning in response to pivoting of the respective levers; and a rack associated with each slide member, said racks meshing with the respective gears to effect sliding movement of said slide members in response to pivoting of the respective levers.

7. A device as set forth in claim 4, including:

a pair of spaced apart hinge members coupling said body portions together; and a sleeve for each slide member supported in extension between said hinge members, said sleeves slidably receiving the respective slide members therein.

8. A device as set forth in claim 7, wherein said slide members are slidable in the respective sleeves in a direction generally axially of the slide members and generally parallel to the length dimension of said body portions.

* * * * *